(12) United States Patent
Powell et al.

(10) Patent No.: US 10,223,564 B2
(45) Date of Patent: *Mar. 5, 2019

(54) ATTACHMENT FOR A SMART PHONE INCLUDING A TARGETING OPTIC SYSTEM THAT DIRECTS ILLUMINATION FROM A WHITE LIGHT SOURCE TOWARDS A TARGET AREA

(71) Applicant: The Code Corporation, Draper, UT (US)

(72) Inventors: George Powell, Draper, UT (US); Ryan Hoobler, Salt Lake City, UT (US); Ming Lei, Princeton Junction, NJ (US); Garrett Russell, Phoenixville, PA (US); Mark Ashby, Taylorsville, UT (US)

(73) Assignee: The Code Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,071

(22) Filed: Nov. 6, 2017

(65) Prior Publication Data

US 2018/0060627 A1 Mar. 1, 2018

Related U.S. Application Data

(63) Continuation of application No. 14/964,483, filed on Dec. 9, 2015, now Pat. No. 9,811,703, which is a (Continued)

(51) Int. Cl.
*A45C 11/00* (2006.01)
*G06K 7/10* (2006.01)
*H04M 1/02* (2006.01)

(52) U.S. Cl.
CPC ..... *G06K 7/10831* (2013.01); *G06K 7/10722* (2013.01); *G06K 7/10732* (2013.01); (Continued)

(58) Field of Classification Search
CPC .......... G06K 7/10732; G06K 7/10831; G06K 7/10564; G06K 7/10722; G06K 7/10742; (Continued)

(56) References Cited

U.S. PATENT DOCUMENTS 9,110,355 B1* 8/2015 Nourbakhsh .......... G03B 15/05
9,811,703 B2* 11/2017 Powell ............... G06K 7/10831
(Continued)

*Primary Examiner* — Suezu Ellis
(74) *Attorney, Agent, or Firm* — Timothy P. O'Hagan; Ray Quinney & Nebeker

(57) ABSTRACT

Disclosed herein is an attachment for a smartphone. The smartphone may include i) a camera with an image sensor and a focusing lens located on a back side of the smartphone for capturing an image of a target area; and ii) a white light source on the back side of the smartphone. The attachment may include a targeting optic system. When the attachment is secured to the back side of the smartphone, the targeting optic system may receive illumination emitted by the white light source and direct the illumination towards the target area from a location that is not directly in front of the camera's image sensor. The location may be farther from the focusing lens than the white light source when measured parallel to the back side of the smartphone. The attachment may also direct the illumination into the target area via the targeting optic system.

7 Claims, 11 Drawing Sheets

Related U.S. Application Data continuation of application No. 13/708,835, filed on Dec. 7, 2012, now abandoned.

(52) U.S. Cl.
CPC ....... G06K 7/10811 (2013.01); H04M 1/0264 (2013.01); *A45C 2011/002* (2013.01)

(58) Field of Classification Search
CPC .... G06K 7/10881; G03B 17/12; G03B 17/14; G03B 17/56; G03B 17/565; G03B 17/568; A45C 11/00; A45C 2011/002; A45C 13/002
USPC .................... 235/462.2, 454, 462.42, 462.35
See application file for complete search history.

(56) References Cited

U.S. PATENT DOCUMENTS

| | | | |
|---|---|---|---|
| 9,939,714 B1* | 4/2018 | Matthews | G03B 17/565 |
| 2007/0084926 A1* | 4/2007 | Lopez | G06K 7/10851 |
| | | | 235/454 |
| 2016/0300092 A1* | 10/2016 | Gifford | G06K 7/10821 |

* cited by examiner

ATTACHMENT FOR A SMART PHONE INCLUDING A TARGETING OPTIC SYSTEM THAT DIRECTS ILLUMINATION FROM A WHITE LIGHT SOURCE TOWARDS A TARGET AREA

CLAIM OF PRIORITY

This application is a continuation of U.S. patent application Ser. No. 14/964,483 (hereinafter, "the '483 application"), titled "ATTACHMENT INCLUDING A TARGETING OPTIC SYSTEM THAT DIRECTS ILLUMINATION FROM A WHITE LIGHT SOURCE TOWARDS A TARGET AREA," filed Dec. 9, 2015, with inventors George Powell, Ryan Hoobler, Ming Lei, Garrett Russell, and Mark Ashby. The '483 application is a continuation of U.S. patent application Ser. No. 13/708,835 (hereinafter, "the '835 application"), titled "AN ATTACHMENT INCLUDING A MIRROR THAT CHANGES AN OPTICAL PATH OF A CAMERA DEVICE," filed Dec. 7, 2012, with inventors George Powell, Ryan Hoobler, Ming Lei, Garrett Russell, and Mark Ashby. The '483 application and the '835 application are incorporated by reference as if fully set forth herein.

BACKGROUND

Smartphones (and other types of portable, hand-held computing devices, such as tablet computers) are in widespread use today, most often in connection with entertainment, communications and office productivity. Most smartphones include a camera. Therefore, with appropriate software, such smartphones can be used to read bar codes. However, smartphones typically have poor bar code reading capability.

SUMMARY

In accordance with one aspect of the present disclosure, an attachment for a smartphone is disclosed. The smartphone may include i) a camera with an image sensor and a focusing lens located on a back side of the smartphone for capturing an image of a target area at the back side of the smartphone; and ii) a white light source on the back side of the smartphone for projecting a field of illumination towards the target area. The attachment may include a targeting optic system. When the attachment is secured to the back side of the smartphone, the targeting optic system may receive illumination emitted by the white light source and direct the illumination towards the target area from a location that is not directly in front of the camera's image sensor. The attachment may direct illumination from the white light source to the location, the location being farther from the focusing lens than the white light source when measured parallel to the back side of the smartphone. The attachment may also direct the illumination into the target area via the targeting optic system.

The attachment may also include a target generating optic that forms one of a targeting point or a targeting pattern within the target area. The targeting point or pattern may be formed at a center of a field of view of the camera when the camera is at an optical distance from a barcode.

The attachment may also include a collimating element collimating the illumination directed towards the target area. The illumination may be collimated to form a bar. A length of the bar may be approximately a width of a field of view of the camera.

The attachment may also include a target generating optic that forms one of a targeting point or a targeting pattern within the target area. The targeting point or pattern may be formed at a center of a field of view of the camera when the camera is at an optical distance from a barcode.

In accordance with another aspect of the present disclosure, an attachment for a smartphone is disclosed. The smartphone may include i) a camera with an image sensor and a focusing lens located on a back side of the smartphone for capturing an image of a target area at the back side of the smartphone; and ii) a white light source on the back side of the smartphone for projecting a field of illumination towards the target area. The attachment may include a targeting optic system. When the attachment is secured to the back side of the smartphone, the targeting optic system may receive illumination emitted by the white light source and direct the illumination towards the target area from a position offset from the camera's image sensor in order to prevent glare. The attachment may direct the illumination from the white light source to the position offset from the camera's image sensor, the position being at a distance from the camera's image sensor that is greater than a distance between the white light source and the camera's image sensor. The attachment may also direct the illumination into the target area via the targeting optic system.

In accordance with another aspect of the present disclosure, a method of reading a barcode using a smartphone is disclosed. The smartphone may include i) a camera with an image sensor and a focusing lens located on a back side of the smartphone for capturing an image of a target area at the back side of the smartphone; and ii) a white light source on the back side of the smartphone for projecting a field of illumination towards the target area. The method may include securing an attachment to the back side of the smartphone over the white light source. When the attachment is secured to the back side of the smartphone, the attachment may direct illumination emitted by the white light source towards the target area from a position offset from the focusing lens in order to prevent glare. The method may also include using the camera's image sensor to capture the image of the target area to read the barcode positioned within the target area. The attachment may direct the illumination from the white light source to the position offset from the focusing lens, the position being at a distance from the focusing lens that is greater than a distance between the white light source and the focusing lens when measured parallel to the back side of the smartphone. The attachment may also direct the illumination into the target area via the targeting optic system.

DETAILED DESCRIPTION

As used in this patent specification and the accompanying claims, the term "camera device" will be used to describe a portable, hand-held computing device that comprises a camera. As indicated above, one example of a camera device is a smartphone. Another example of a camera device is a tablet computer.

As used herein, the term "camera" refers to an apparatus for capturing digital images. A camera that is included in a digital computing device (such as a smartphone, tablet computer, etc.) typically comprises a lens and an image sensor.

This patent specification describes an attachment for a camera device. The attachment may include one or more components that improve the bar code reading capabilities of the camera device. For example, the attachment may include a target generating mechanism, a proximity sensor, illumination optimized for bar code reading, optics that change the optical path to the camera device, a supplementary lens system that is optimized for bar code reading, etc.

Target Generating Mechanism

Figure 1A:
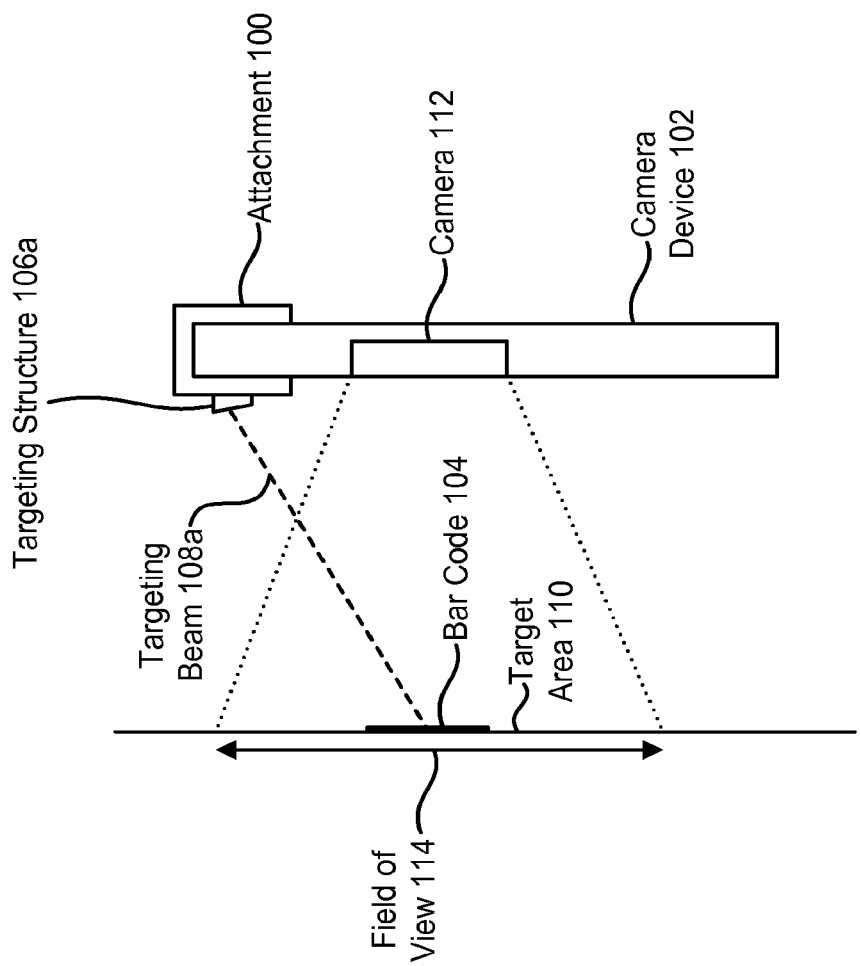
FIGS. 1A-1B illustrate an example of a camera device attachment that includes a target generating mechanism.
Figure 1B:
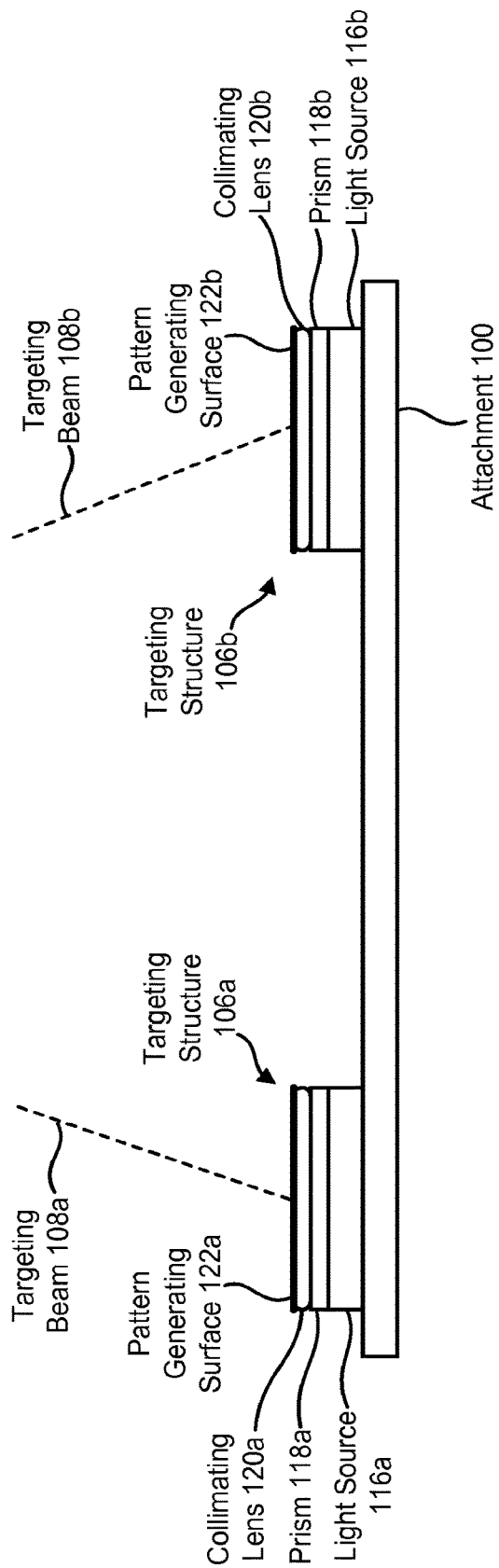

FIGS. 1A-1B illustrate an example of a camera device attachment 100 that includes a target generating mechanism. The target generating mechanism may be utilized to facilitate rapid and optimal positioning of a camera device 102 with respect to a bar code 104 that the camera device 102 is attempting to read. This is especially useful when the camera device 102 does not have a display, or the display is dimmed or turned off to conserve the battery power, or the display is difficult to be viewed when the device 102 is operated as a bar code reader.

The target generating mechanism may include multiple targeting structures 106a, 106b. These targeting structures 106a, 106b may project non-parallel targeting beams 108a, 108b, each of which form a point or a pattern on the target area 110. The targeting structures 106a, 106b may be configured so that (1) at the optimal distance from the camera 112, the targeting beams 108a, 108b converge so that the projected patterns and/or points meet at the center of the camera's field of view 114, and (2) at any distance from the camera 112 other than the optimal distance, the projected patterns and/or points do not meet. Thus, when the camera device 102 is being used to read a bar code 104, the user may move the camera device 102 until the projected patterns and/or points meet, indicating that the camera device 102 is at the optimal distance from the bar code 104 and that the bar code 104 is positioned within the center of the camera's field of view 114.

The targeting structure 106a includes a light source 116a, a prism 118a, a collimating lens 120a, and a pattern generating surface 122a. The targeting structure 106b includes a light source 116b, a prism 118b, a collimating lens 120b, and a pattern generating surface 122b. The light sources 116a, 116b may be laser diodes, light-emitting diodes (LEDs), etc.

Each of the pattern generating surfaces 122a, 122b may be an interference pattern generating element or a diffractive element, such as a holographic element that may include one or more diffractive gratings. Alternatively, each of the pattern generating surfaces 122a, 122b may be a Fresnel type element that has been fabricated with the desired pattern in mind.

Figure 3:
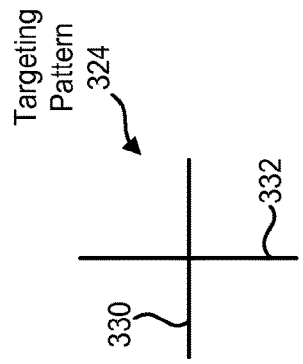
FIGS. 2-4 illustrate various targeting patterns that may be projected by the target generating mechanism shown in FIGS. 1A-1B.
Figure 4:
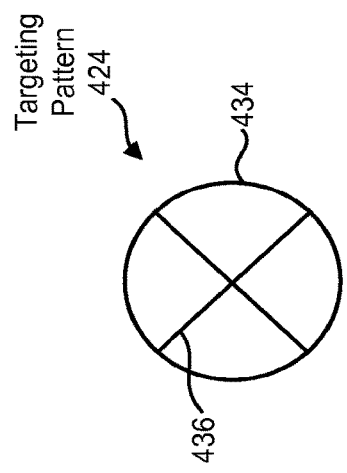
Figure 2:
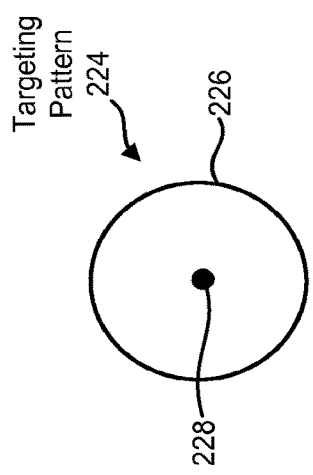

FIGS. 2-4 illustrate various targeting patterns that may be projected by the targeting structures 106a, 106b. As shown in FIG. 2, one possible targeting pattern 224 that may be projected by the targeting structures 106a, 106b is a circle 226 with a dot 228 in the center. One targeting structure 106a may generate the circle 226, while the other targeting structure 106b may generate the dot 228. The targeting structures 106a, 106b may be configured so that when the camera device 102 is an optimal distance from the bar code 104, the dot 228 is substantially in the center of the circle 226 to form the depicted pattern 224.

As shown in FIG. 3, another possible targeting pattern 324 that may be projected by the targeting structures 106a, 106b is a cross comprising a horizontal bar 330 and a vertical bar 332. One targeting structure 106a may generate the horizontal bar 330, while the other targeting structure 106b may generate the vertical bar 332. The targeting structures 106a, 106b may be configured so that when the camera device 102 is an optimal distance from the bar code 104, the horizontal bar 330 and the vertical bar 332 intersect each other to form the depicted pattern 324.

As shown in FIG. 4, another possible targeting pattern 424 that may be projected by the targeting structures 106a, 106b is a circle 434 comprising an X 436. One targeting structure 106a may generate the circle 434, while the other targeting structure 106b may generate the X 436. The targeting structures 106a, 106b may be configured so that when the camera device 102 is an optimal distance from the bar code 104, the circle 434 and the X 436 may intersect each other to form the depicted pattern 424.

Another possible targeting pattern may include one or more bars. The bar(s) may be, for example, blue LED bar(s). The length of the bar(s) may approximately coincide with the width of the field of view of the camera device 102.

Another possible targeting pattern may include multiple (e.g., two) circles. The circles may overlap at the optimal distance from the bar code 104.

Proximity Sensor

Figure 5A:
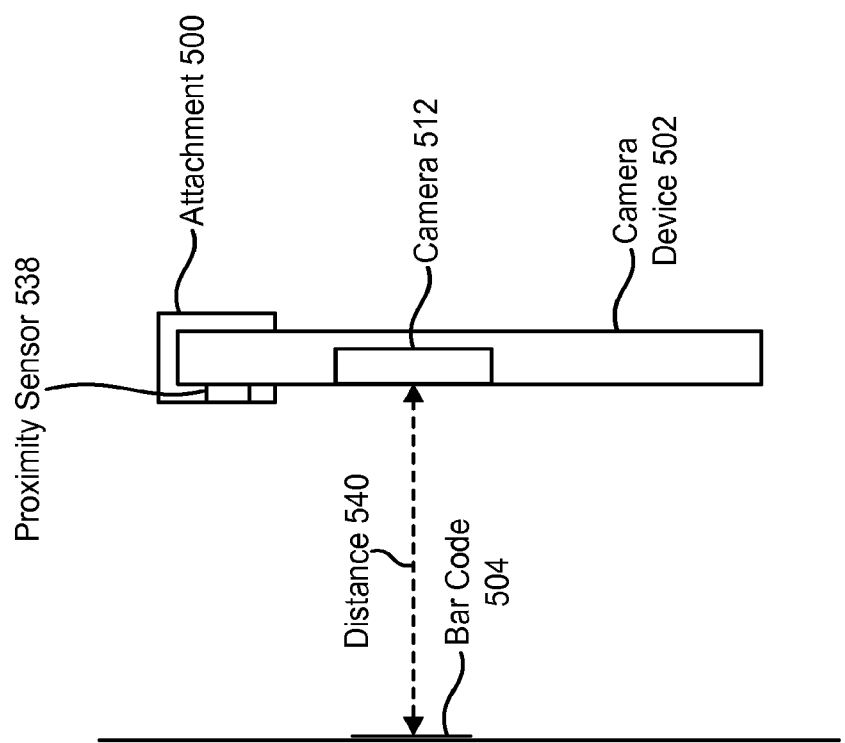
FIGS. 5A-5B illustrate an example of a camera device attachment that includes a proximity sensor.
Figure 5B:
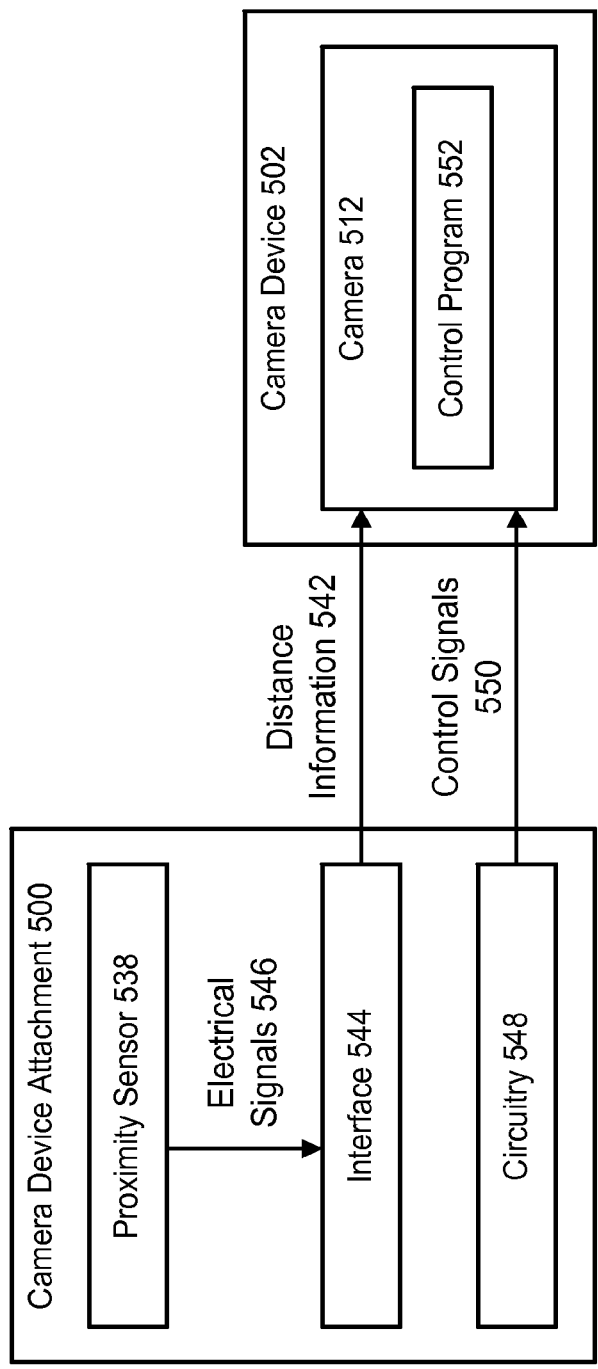

FIGS. 5A-5B illustrate an example of a camera device attachment 500 that includes a proximity sensor 538. The proximity sensor 538 may determine the distance 540 between the camera 512 and a bar code 504 that the camera device 502 is attempting to read. The proximity sensor 538 may then provide information 542 about this distance 540 to the camera 512.

The attachment 500 may include an interface 544 between the proximity sensor 538 and the camera 512. The interface 544 may facilitate communication of the distance information 542 from the proximity sensor 538 to the camera 512 (e.g., to a control program 552 running on the camera 512). More specifically, the interface 544 may receive electrical signals 546 from the proximity sensor 538. The electrical signals 546 may indicate the distance 540 between the camera 512 and the bar code 504 that the camera device 502 is attempting to read. The interface 544 may convert the electrical signals 546 into distance information 542 that is in a format that the camera 512 is capable of understanding. Alternatively, the electrical signals 546 from the proximity sensor 538 may be sent to the control program 552 using a connector supported by the camera device 502 or wirelessly.

The attachment 500 may also include circuitry 548 that sends control signals 550 to the camera 512. The control signals 550 may cause the camera 512 to use the distance information 542 from the proximity sensor 538 to assist with focusing appropriately.

Figure 6:
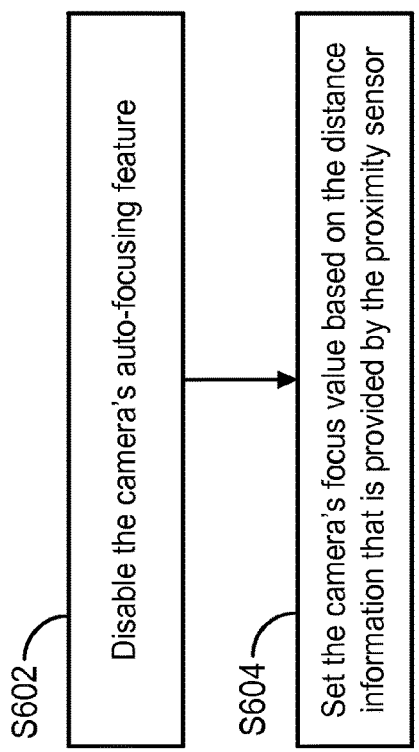
FIG. 6 illustrates one way that a camera device may utilize distance information provided by the proximity sensor shown in FIGS. 5A-5B.

For example, referring to FIG. 6, the control signals 550 may cause the camera 512 to disable the camera's auto-focusing feature (step S602) and set the camera's focus value based on the distance information 542 that is provided by the proximity sensor 538 (step S604).

Figure 7:
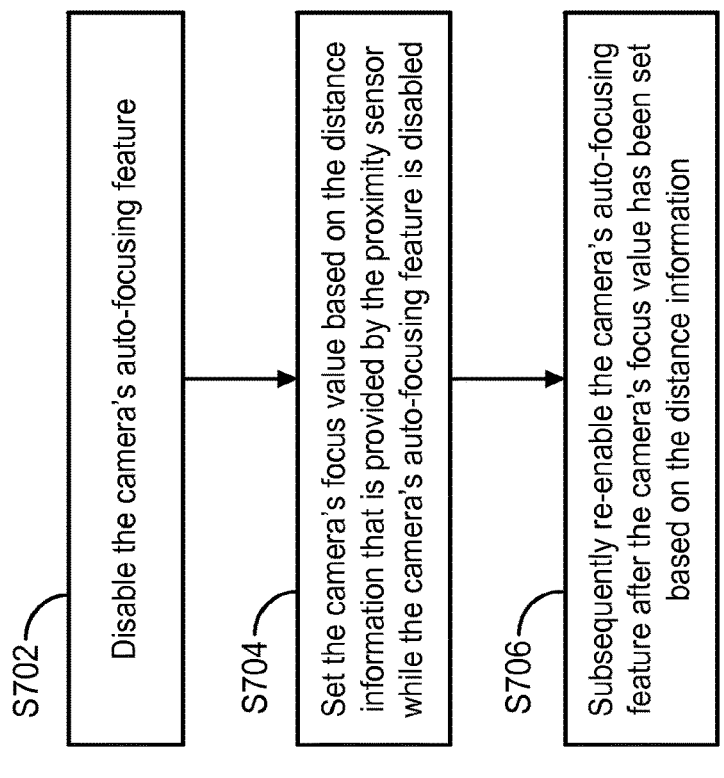
FIG. 7 illustrates another way that a camera device may utilize distance information provided by the proximity sensor shown in FIGS. 5A-5B.

Alternatively, referring to FIG. 7, the control signals 550 may cause the camera 512 to temporarily disable the camera's auto-focusing feature (step S702) and set the camera's focus value based on the distance information 542 that is provided by the proximity sensor 538 (step S704). Then, the camera 512 may subsequently re-enable the camera's auto-focusing feature after the camera's focus value has been set based on the distance information 542 (step S706).

Illumination Optimized for Bar Code Reading

Figure 8B:
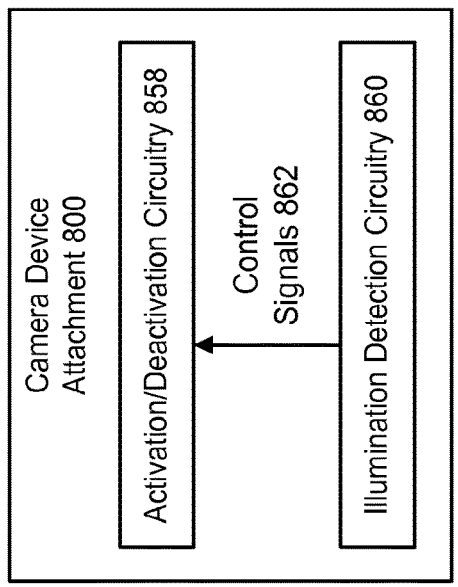
FIGS. 8A-8B illustrate an example of a camera device attachment that includes illumination that is optimized for bar code reading.
Figure 8A:
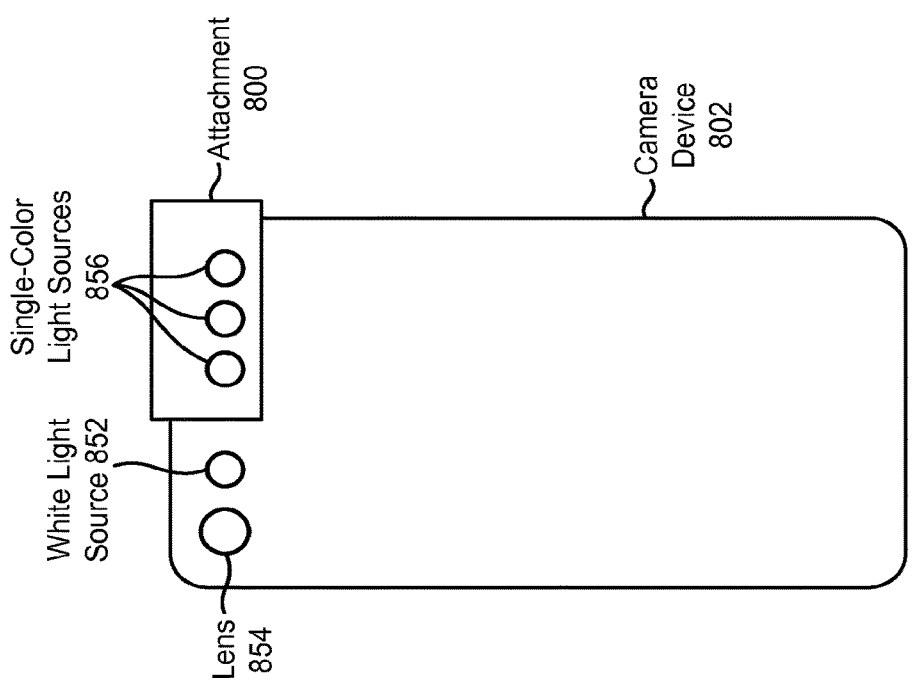

FIGS. 8A-8B illustrate an example of a camera device attachment 800 that includes illumination that is optimized for bar code reading. The attachment 800 may be used in connection with a camera device 802 that includes a light source 852 that provides white illumination. This light source 852 may be referred to herein as a white light source 852. The camera device 802 may also include a lens 854.

The attachment 800 may include one or more single-color light sources 856. The single-color light sources 856 may be light-emitting diodes (LEDs). The single-color light sources 856 may provide red illumination (i.e., illumination having a wavelength of about 650 nm).

The attachment 800 may include circuitry 858 that activates and deactivates the single-color light sources 856. This circuitry 858 may be referred to herein as activation/deactivation circuitry 858. In addition, the attachment 800 may include circuitry 860 that detects when the white light source 852 of the camera device 802 is activated and when the white light source 852 of the camera device 802 is deactivated. This circuitry 860 may be referred to herein as illumination detection circuitry 860.

The activation/deactivation circuitry 858 may activate the single-color light sources 856 in response to the white light source 852 of the camera device 802 being activated. Similarly, the activation/deactivation circuitry 858 may deactivate the single-color light sources 856 in response to the white light source 852 of the camera device 802 being deactivated.

For example, when the illumination detection circuitry 860 detects that the white light source 852 of the camera device 802 has been activated, the illumination detection circuitry 860 may send control signals 862 to the activation/deactivation circuitry 858 that cause the activation/deactivation circuitry 858 to activate the single-color light sources 856. Conversely, when the illumination detection circuitry 860 detects that the white light source 852 of the camera device 802 has been deactivated, the illumination detection circuitry 860 may send control signals 862 to the activation/deactivation circuitry 858 that cause the activation/deactivation circuitry 858 to deactivate the single-color light sources 856.

Figure 9:
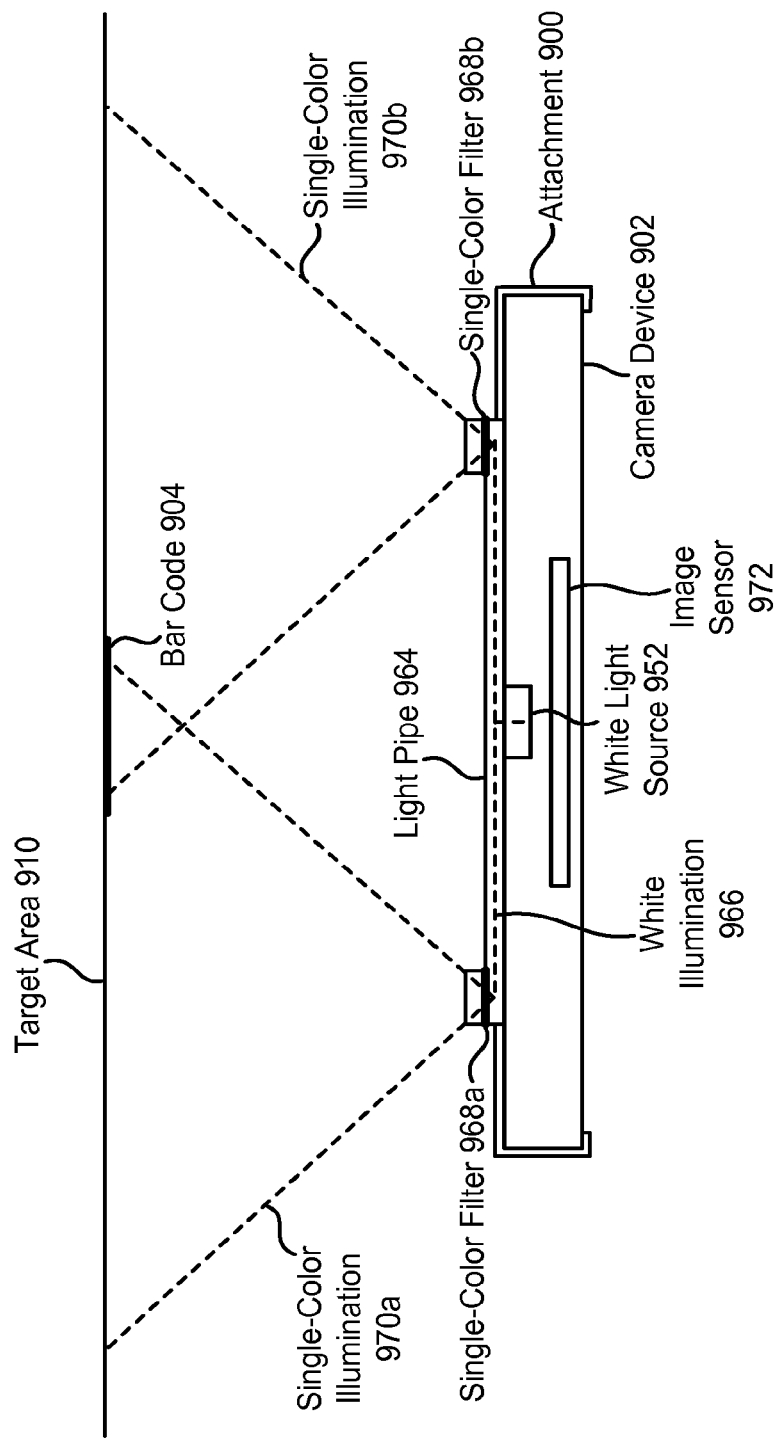
FIG. 9 illustrates another example of a camera device attachment that includes illumination that is optimized for bar code reading.

FIG. 9 illustrates another example of a camera device attachment 900 that includes illumination that is optimized for bar code reading. The camera device 902 includes a white light source 952. The attachment 900 includes a light pipe 964 that redirects white illumination 966 provided by the white light source 952 of the camera device 902. Single-color filters 968a, 968b (e.g., red filters) within the light pipe 964 filter the redirected white illumination 966, so that single color illumination 970a, 970b (e.g., red illumination) is directed toward the target area 910.

The light pipe 964 may be configured so that the single-color illumination 970a, 970b is offset from the camera's image sensor 972 in order to prevent glare. In other words, the single-color illumination 970a, 970b may be directed toward the target area 910 from locations that are not directly in front of the camera's image sensor 972.

Optics that Change the Optical Path to the Camera Device

With many camera devices, the focusing lens for the image sensor is located on the back side of the camera device. Therefore, in order to attempt to read a bar code, the camera device must be positioned so that the back side of the camera device is aimed at the bar code.

Figure 10:
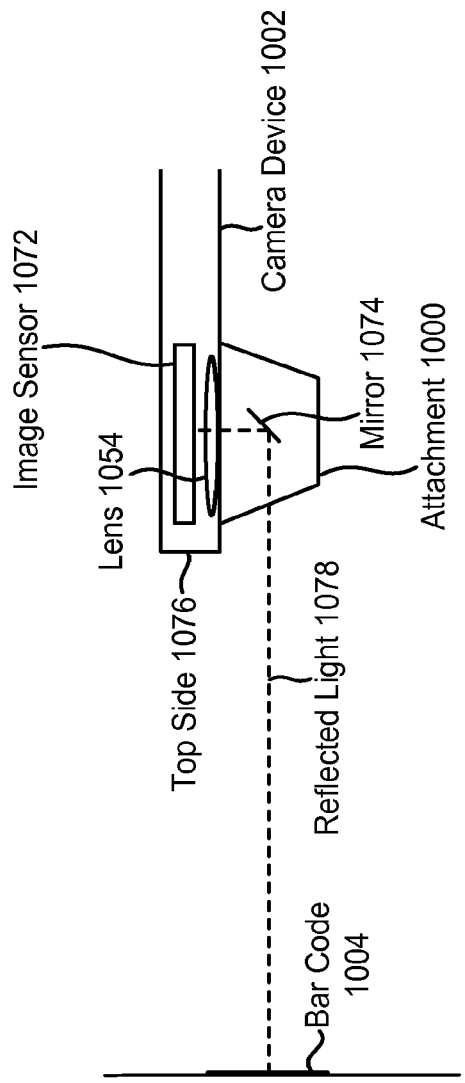
FIG. 10 illustrates an example of a camera device attachment that includes a mirror that changes the optical path to the camera device.

FIG. 10 illustrates an example of a camera device attachment 1000 that includes a mirror 1074 that changes the optical path to the camera device 1002. The attachment 1000 permits a user of the camera device 1002 to attempt to read a bar code 1004 by aiming the top side 1076 of the camera device 1002 at the bar code 1004. Light 1078 is reflected from the bar code 1004 and redirected by the mirror 1074 toward the camera device's focusing lens 1054, which focuses the reflected light 1078 onto the camera device's image sensor 1072.

In the depicted example, the mirror 1074 is positioned so that the reflected light 1078 is redirected by 90°. Alternatively, however, the mirror 1074 may be positioned so that the reflected light 1078 is redirected by a different angle.

Supplementary Lens System Optimized for Bar Code Reading

Figure 11:
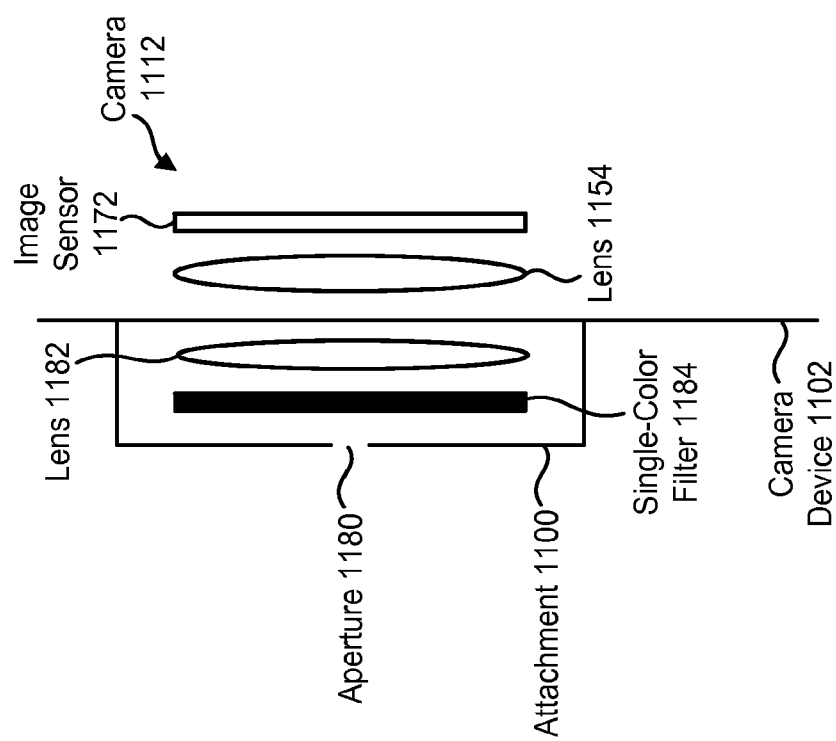
FIG. 11 illustrates an example of a camera device attachment that includes a supplementary lens system that is optimized for bar code reading.

FIG. 11 illustrates an example of a camera device attachment 1100 that includes a supplementary lens system that is optimized for bar code reading.

The supplementary lens system may include an aperture 1180. The aperture 1180 limits the amount of light that reaches the camera's image sensor 1172. This may improve the depth of field of the camera 1112. With enhanced depth of field, the need for auto-focusing is reduced and decode response is improved.

The supplementary lens system may include a lens 1182 that is optimized for bar code reading. For example, the lens 1182 may minimize distortion. The lens 1128 can produce images having a relatively small field of view and a relatively large bar code element size, thus making it easier to read bar codes with small printing size (e.g., between 3 millimeters and 6 millimeters).

The supplementary lens system may include a single-color filter 1184 (e.g., a red filter). The filter 1184 may be positioned in front of the lens 1182 that is optimized for bar code reading.

Activation of Components that Improve Bar Code Reading Capabilities

As indicated above, this patent specification describes an attachment for a camera device, wherein the attachment includes one or more components that improve the bar code reading capabilities of the camera device. An attachment as described herein may be configured to automatically activate the components that improve the bar code reading capabilities of the camera device in response to a detectable signal provided by the camera device. This signal may include, for example, a recognizable illumination pattern of the camera device.

Figure 12:
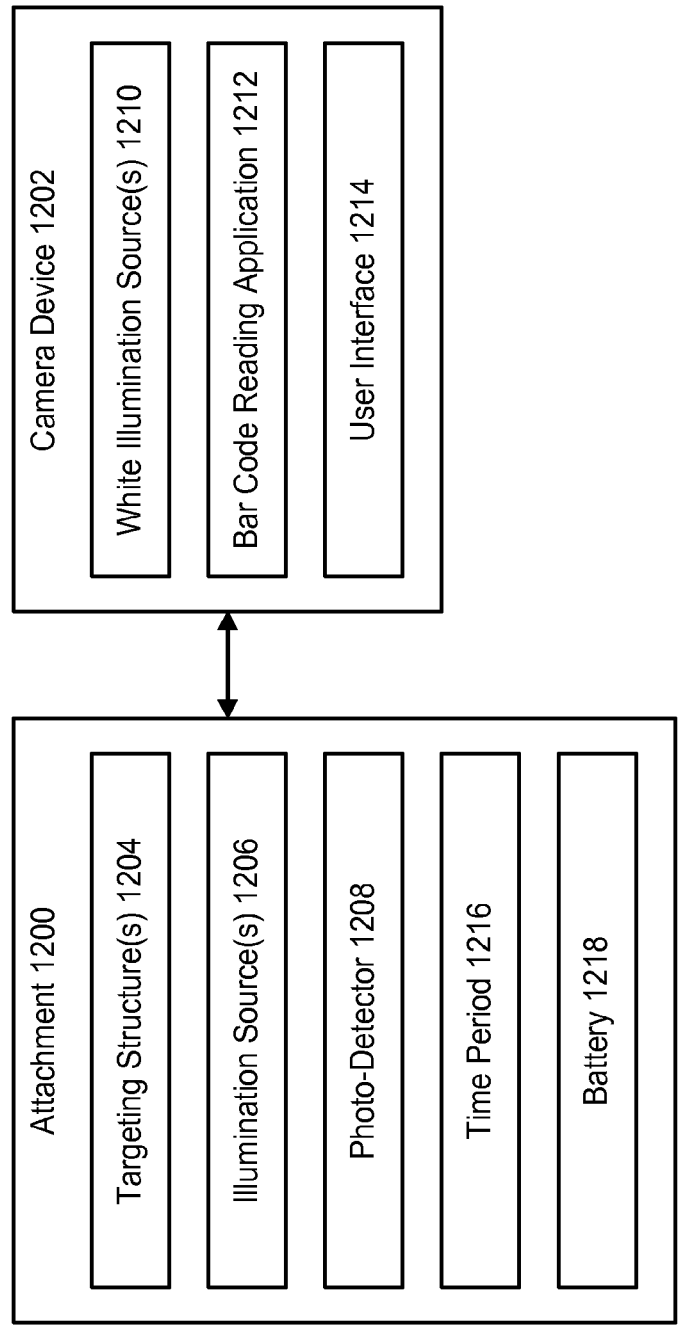
FIG. 12 illustrates an example of a camera device attachment that automatically activates the components that improve the bar code reading capabilities of the camera device in response to a detectable signal provided by the camera device.

An example will be described in relation to FIG. 12, which illustrates an attachment 1200 for a camera device 1202. The attachment 1200 may include one or more targeting structures 1204. The targeting structure(s) 1204 may be similar to the targeting structures 106a, 106b shown in FIG. 1B. The targeting structure(s) 1204 may produce targeting beams, which may be similar to the targeting beams 108a, 108b shown in FIG. 1B.

The attachment 1200 may also include one or more illumination sources 1206. The illumination source(s) 1206 may be similar to the single-color light sources 856 shown in FIG. 8A.

The attachment 1200 may also include a photo-detector 1208. The photo-detector 1208 may be an image sensor.

The camera device 1202 may include one or more white illumination sources 1210. In addition, the camera device 1202 may include a bar code reading application 1212.

The camera device 1202 may be used to attempt to read a bar code (such as the bar code 104 shown in FIG. 1A). The bar code reading application 1212 may receive user input to begin attempting to read the bar code. For example, the user may press a "scan" button that is displayed via a user interface 1214 of the camera device 1202. In response, the white illumination source(s) 1210 of the camera device 1202 may be activated and deactivated in accordance with a pattern that is recognizable to the photo-detector 1208 in the attachment 1200. For example, the white illumination source(s) 1210 of the camera device 1202 may be briefly turned on and then turned off again.

The photo-detector 1208 in the attachment 1200 may detect this pattern. In response, the targeting structure(s) 1204 and the illumination source(s) 1206 of the attachment 1200 may be activated for a defined time period 1216. This time period 1216 may be configurable. During this time period 1216, the user can aim the targeting beams at the bar code and use the camera device 1202 to attempt to read the bar code.

The attachment 1200 may include its own battery 1218 to power the photo-detector 1208, the targeting structure(s) 1204 and the illumination source(s) 1206.

Meaning of "Attachment"

As used throughout this patent specification and the accompanying claims, an "attachment" for a camera device may include just a single component that improves the bar code reading capabilities of the camera device. Alternatively, an attachment may include multiple components that improve the bar code reading capabilities of the camera device. In addition, an attachment for a camera device may provide additional functionality that is unrelated to improving the bar code reading capabilities of the camera device.

An attachment for a camera device may cover a relatively small portion of the camera device. Alternatively, an attachment for a camera device may be a protective case that covers a substantial portion of the camera device.

Potential Uses

Bar code verification is the process of measuring the print quality of a printed bar code to analyze how it will perform in different environments with different types of scanning equipment. The process of verification involves checking the visual aspects (for modulation, decodability and more) of printed bar codes against standards made by international organizations.

An attachment that improves the bar code reading capabilities of a camera device, as described herein, may enable a camera device to be used for bar code verification, print verification, and/or other types of verification, and/or for reading direct part marks.

For bar code print quality verification or general printing analysis, the attachment must provide fixed reading distance and ensure there is no distortion when capturing an image of the target to be verified. When the imaging distance is fixed, the camera device can be calibrated to remove lens distortion and establish a conversion factor between the number of pixels and the actual physical size.

For reading direct part marks, ambient lighting or LED lighting from the camera device is usually not suitable to create sufficient contrast for decoding the marks. A special lighting attachment that provides diffused on-axis illumination and/or low angle illumination is needed.

Anti-Microbial Housing

An attachment as described herein may include an anti-microbial housing, i.e., a housing that includes one or more additives (e.g., a silver iodide additive) that inhibit the growth of mold and bacteria on the surface of the housing. This type of housing may be beneficial if a camera device is going to be used in a medical environment.

Chemical-Resistant Housing

Camera devices are often made with a housing of amorphous plastics, such as polycarbonate/acrylonitrilebutadiene-styrene (PC/ABS). Housings made of PC/ABS contain a loosely packed structure which makes it easier for chemicals to penetrate the plastic. Repeated use of chemical cleansers (e.g., cleansers that include isopropyl alcohol) may damage such housings. However, the use of chemical cleansers may be important. For example, if a camera device is going to be used as a bar code reader in a medical environment, it is important to frequently disinfect the camera device in order to try to prevent or limit the spread of infection.

An attachment as described herein may include a housing that is designed to resist the harmful effects of chemical cleansers. Such a housing may be referred to as a "chemical-resistant" (or a "disinfectant-ready") housing. A chemical-resistant housing may include one or more additives (e.g., silicone) that reduce the harmful effects of chemical cleansers.

The claims are not limited to the specific implementations described above. Various modifications, changes and variations may be made in the arrangement, operation and details of the implementations described herein without departing from the scope of the claims.

What is claimed is:

1. An attachment for a smartphone, the smartphone comprising: i) a camera with an image sensor and a focusing lens located on a back side of the smartphone for capturing an image of a target area at the back side of the smartphone; and ii) a white light source on the back side of the smartphone for projecting a field of illumination towards the target area, the attachment comprising:

a targeting optic system which, when the attachment is secured to the back side of the smartphone, receives illumination emitted by the white light source and directs the illumination towards the target area from a position offset from the camera's image sensor in order to prevent glare;

wherein the attachment:

directs the illumination from the white light source to the position offset from the camera's image sensor, the position being at a distance from the camera's image sensor that is greater than a distance between the white light source and the camera's image sensor; and directs the illumination into the target area via the targeting optic system.

2. The attachment of claim 1, further including a target generating optic that forms one of a targeting point or targeting pattern within the target area.

3. The attachment of claim 2, wherein the targeting point or pattern is formed at a center of a field of view of the camera when the camera is at an optical distance from a barcode.

4. The attachment of claim 1, further including a collimating element collimating the illumination directed towards the target area.

5. The attachment of claim 4, further including a target generating optic forming one of a targeting point or a targeting pattern within the target area.

6. The attachment of claim 5, wherein the targeting point or pattern is formed at a center of a field of view of the camera when the camera is at an optical distance from a barcode.

7. The attachment of claim 4, wherein the illumination is collimated to form a bar, wherein a length of the bar is approximately a width of a field of view of the camera.

* * * * *